(12) United States Patent
Gerges et al.

(10) Patent No.: US 10,269,093 B1
(45) Date of Patent: *Apr. 23, 2019

(54) DYNAMIC SCALING OF VISUALIZATION DATA WHILE MAINTAINING DESIRED OBJECT CHARACTERISTICS

(71) Applicant: Finger Food Studios, Inc., Port Coquitlam (CA)

(72) Inventors: Botrous Gerges, Port Coquitlam (CA); Steven William Pridie, Port Coquitlam (CA)

(73) Assignee: Finger Food Studios, Inc., Port Coquitlam (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,515

(22) Filed: Oct. 5, 2018

Related U.S. Application Data

(63) Continuation of application No. 15/862,453, filed on Jan. 4, 2018, now Pat. No. 10,121,225.

(51) Int. Cl.
| | |
|---|---|
| G06T 17/00 | (2006.01) |
| G06T 3/40 | (2006.01) |
| G06T 17/20 | (2006.01) |
| G06T 15/10 | (2011.01) |
| F16L 1/12 | (2006.01) |

(52) U.S. Cl.
CPC ............ G06T 3/4007 (2013.01); F16L 1/12 (2013.01); G06T 3/4023 (2013.01); G06T 15/10 (2013.01); G06T 17/00 (2013.01); G06T 17/20 (2013.01)

(58) Field of Classification Search
CPC ......... G06T 17/00; G06T 17/20; E21B 47/08; E21B 47/082; F16L 2101/30
See application file for complete search history.

(56) References Cited

U.S. PATENT DOCUMENTS

| 6,351,717 B2 | 2/2002 | Lambrecht |
|---|---|---|
| 8,447,532 B1 | 5/2013 | Goroshevskiy et al. |

(Continued)

OTHER PUBLICATIONS

Unknown, Gemini NPS36, 36" (900 mm) VECTRA/GEOPIG Combo ILI Instrument, Tool Data Sheet, Baker Hughes, Published in 2014, last accessed Dec. 19, 2017, 2 total pages.

(Continued)

*Primary Examiner* — Ryan McCulley
(74) *Attorney, Agent, or Firm* — SoCal IP Law Group LLP; Jonathan Pearce

(57) ABSTRACT

Visualization of three-dimensional data without loss of desired characteristics is enabled by receiving three-dimensional data pertaining to a physical object in the world, the physical object represented by a series of segments, the three-dimensional data including a predetermined number of measurements of the series of segments, storing the three-dimensional data in data storage and generating an average measurement value for each of the series of segments. The process further involves generating a first generalization of the three-dimensional data by selecting, for each of the series of segments, a desired number of measurements, fewer than the predetermined number of measurements, that represent the largest deviations from the respective average measurement, storing the selected measurements as the first generalization of the three-dimensional data in the data storage, and upon request, providing access to the first generalization of the three-dimensional data.

20 Claims, 7 Drawing Sheets

(56) References Cited

U.S. PATENT DOCUMENTS

| | | |
|---|---|---|
| 8,542,127 B1 | 9/2013 | Goroshevskiy et al. |
| 2007/0136029 A1 | 6/2007 | Selig, IV et al. |
| 2011/0301893 A1 | 12/2011 | Leal Diaz et al. |
| 2012/0132007 A1 | 5/2012 | Dria et al. |
| 2013/0000980 A1 | 1/2013 | Dolgin et al. |
| 2015/0134276 A1 | 5/2015 | Mantegazza et al. |
| 2015/0285065 A1 | 10/2015 | Howell et al. |
| 2015/0345688 A1 | 12/2015 | Kersey et al. |
| 2016/0231278 A1 | 8/2016 | Goroshevskiy et al. |
| 2017/0350864 A1 | 12/2017 | Goroshevskiy et al. |
| 2018/0010438 A1 | 1/2018 | Ravi et al. |
| 2018/0017376 A1 | 1/2018 | Moore |

OTHER PUBLICATIONS

Unknown, Ultrasight In-Line Inspection Services, Overview Article, Baker Hughes, Published in 2016, last accessed Dec. 19, 2017, https://assets.www.bakerhughes.com/system/73/8d8890948711e6b9892d73c78b1d88/BHI-ULTRASIGHT-Overview-_US_.pdf, 2 pages.

US 10,269,093 B1

DYNAMIC SCALING OF VISUALIZATION DATA WHILE MAINTAINING DESIRED OBJECT CHARACTERISTICS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent is a continuation of application Ser. No. 15/862,453, filed Jan. 4, 2018, titled DYNAMIC SCALING OF VISUALIZATION DATA WHILE MAINTAINING DESIRED OBJECT CHARACTERISTICS.

BACKGROUND

Field

This disclosure relates to visualization of large data sets and, more particularly, to dynamic scaling of visualization data while maintaining desired object characteristics.

Description of the Related Art

Many industries routinely perform analysis of the suitability of its equipment to continue to perform its desired functions. For example, cities, municipalities, and associated organizations routinely evaluate their water delivery and sewage recovery systems for potential leaks, potential service disruptions, and other potential problems. In less-sophisticated situations, such evaluations merely rely upon statistical analysis of the age and install date of associated pipelines to predict when pipelines should be serviced, replaced, or repaired.

Similarly, long-distance delivery systems for water (e.g. the California Aqueduct system) or petroleum products routinely perform similar analyses and inspections of those pipelines. The water or petroleum products transmitted on these pipelines are sufficiently valuable and the potential damage severe that careful inspection is desirable. In other cases, legal mandates require inspections and ongoing evaluation on a regular basis.

In systems that are able to be temporarily disabled for short periods of time, mapping sleds may be sent through a particular section of pipeline or through an entire pipeline. These sleds may be specially-designed for a pipe, such that they fit snugly within a pipeline and are designed to robotically or automatically traverse the entire pipeline or section over the course of hours or, perhaps, over a series of days.

A mapping sled may incorporate any number of sensors such as LIDAR, infrared cameras, ordinary cameras in conjunction with illumination capabilities, global positioning systems, magnetometers, gravitometers, depth or distance sensors, along with other sensors suitable for gathering detailed data for a pipeline or a pipeline section from within during its traversal of the pipeline.

Because the traversals are on a regular basis, the data generated has both a three-dimensional scale of the actual shape and contours and position of a pipeline or pipeline section, but also has data pertaining to any changes in such three-dimensional data over time.

However, in the past, visualization of such data has been difficult. The sheer volume of data is enormous. For example, in one application, a total of 80 radial depth measurements of the interior of a pipeline are taken per centimeter traversed by a mapping sled. When pipelines can travel over distances as great as hundreds or thousands of miles, presenting such a volume of data (and, indeed, storing it or transmitting it) can be very bandwidth or storage intensive. For example, many inspectors wish to access this data in remote locations with limited bandwidth on mobile devices. In such cases, minimizing the storage and bandwidth cost of the associated data is important. When historical data is added to the most recently-created data, the volume only grows.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
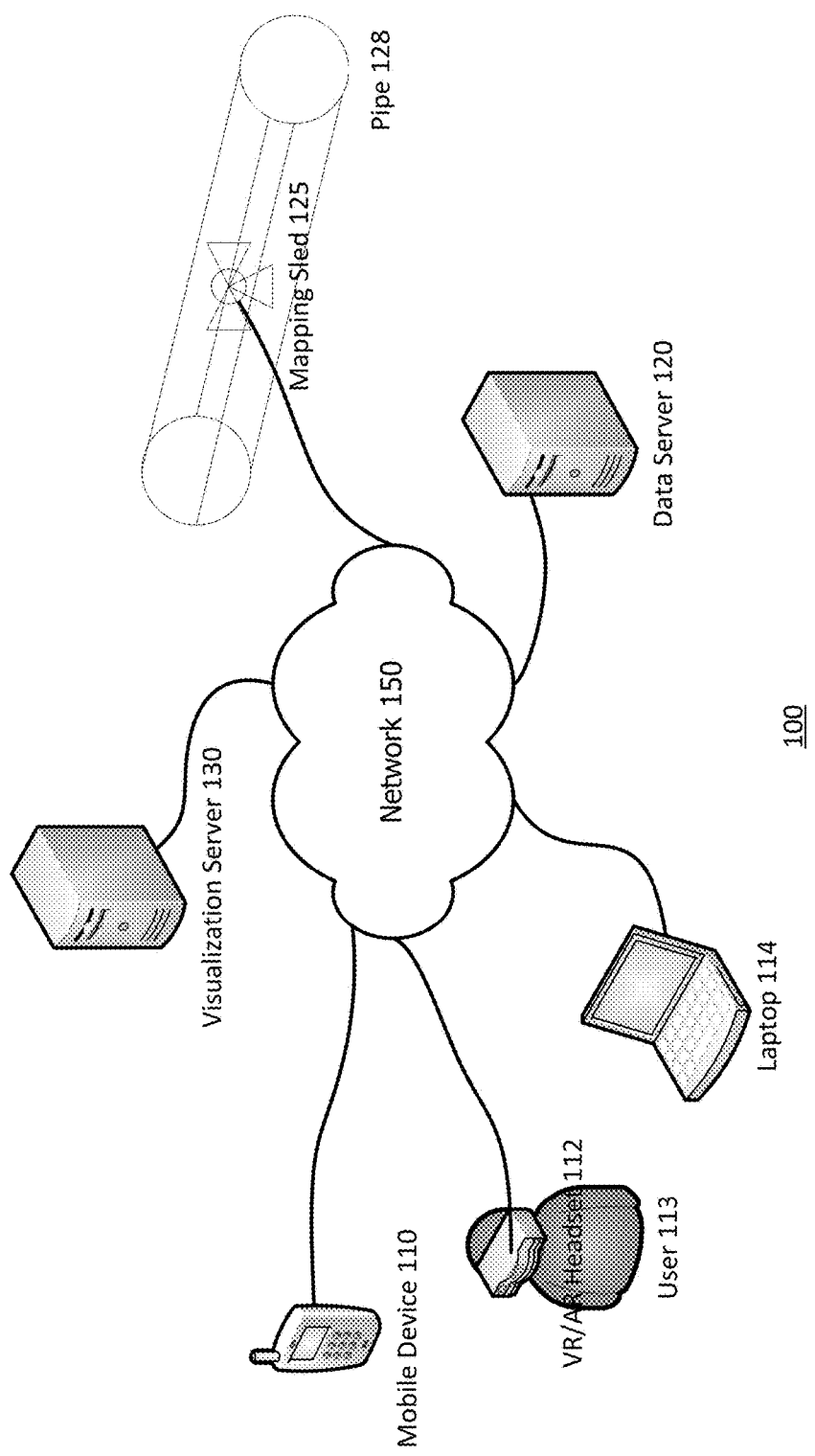
FIG. 1 is a block diagram of a system for dynamic scaling of visualization data while maintaining desired object characteristics.

Referring now to FIG. 1, a block diagram of a system 100 for dynamic scaling of visualization data while maintaining desired object characteristics is shown. The system 100 includes one or more visualization devices, such as a mobile device 110, a VR/AR headset 112 (and an associated user 113), and a laptop 114. The system 100 further includes a data server 120, a pipe 128 with a mapping sled 125, a visualization server 130, all interconnected by a network 150.

The mobile device 110, VR/AR headset 112, and laptop 114 are each computing devices running software that enables them to perform the functions described herein. In particular, each of these devices are examples of computing devices that are capable of requesting, receiving, and displaying visualization data as discussed herein. Accordingly, each of these devices has a processor, memory, and at least one display. Each of these devices includes some system for communication with other devices via the network 150 (e.g. a wireless or wired network adapter).

A mobile device 110 may be a mobile phone, a handheld computer or tablet, a so-called "smart" watch, or a similar device. A VR/AR headset 112 may be a stand-alone headset such as the Oculus® Rift® or HTC® VIVE® headsets, a headset made from, in whole or in part, a mobile device such as the Samsung® Gear® VR headset or Merge® headset. Alternatively, the VR/AR headset 112 may be an augmented or mixed reality headset such as the Microsoft® HoloLens®. Whatever the case, the VR/AR headset 112 may be stand-alone or may require connection to a serving computer with greater capabilities than those provided by the VR/AR headset 112 itself. The laptop 114 is shown as a laptop computer, but may be a so-called "desktop" computer, an all-in-one computer, or other computing device. The laptop 114 need not necessarily be a "portable" computer, though that may be most common in practical usage in the system 100.

The data server 120 is a computing device running software that enables it to perform the functions described herein. Specifically, the data server 120 includes database software suitable for storing raw data generated for a pipeline or pipeline segment generated by a mapping sled, such as mapping sled 125. This database may be capable of executing queries to its stored data for particular pipeline segments identified by location, coordinates, database identifiers, or other data. The database may also be capable of selectively accessing particular time-frames of mapping data.

As used herein, the words "pipeline" or "pipe" shall mean a tubular three-dimensional shape with a circular, oval, or semi-circular cross-section through which liquids or gasses can be transmitted. Pipelines or pipes need not be regular in shape, and may include one or more flat or concave interior sides. Pipelines or pipes expressly include sub-sections (e.g. a pipeline section) thereof of any length.

The mapping sled 125 within the pipe 128 is a computing device running software that enables it to perform the functions described herein. The mapping sled 125 includes at least one sensor from the group of LIDAR, infrared cameras, ordinary cameras in conjunction with illumination capabilities, global positioning systems, magnetometers, gravitometers, and depth or distance sensors. The mapping sled 125 may include other sensors suitable for gathering detailed data for a pipeline or a pipeline section from within during its traversal of the pipeline.

The mapping sled 125 may incorporate wireless or wired communication capabilities or may utilize on-board storage to store data created as a result of the pipeline mapping operation as the mapping sled traverses a pipeline regarding the characteristics of the pipeline. For example, a towed sled may maintain a wired connection to another point in the pipeline, whereas a self-propelled sled may be required to store data for the duration of its traversal.

The data created by a mapping sled is referred to herein as "mapping data." The mapping data may be a series of numbers in a table representing distances or measurements and may not, without modification, be presentable as a three-dimensional visualization data by computer rendering software. The mapping data includes, at least, a centerline measurement identifying the relative center of the pipeline at each of a series of pipeline segments of arbitrary length (e.g. 1 centimeter or 1 meter) which defines a centerline for a series of radial measurements outward to the interior wall of the pipeline. Preferably, the centerline may also be compared with one or more exterior reference points to generate an overall location within the physical world of the pipeline. Likewise, this centerline may be compared over time to its prior locations to detect movement of a pipeline (or pipeline segment) over time.

If the mapping data is stored during operation of the mapping sled 125, it may be manually or automatically uploaded to the data server 120 upon completion of pipeline traversal. Alternatively, the data may be wirelessly or wireline transmitted as it is created during the pipeline traversal or immediately following a completed pipeline traversal.

The visualization server 130 is a computing device running software suitable for performing the functions described herein. Specifically, the visualization server 130 accesses the mapping data stored by the data server 120 and creates visualization data from that mapping data. In addition, the visualization server 130 may generate one or more "generalizations" of that visualization data to reduce the overall storage requirements for that visualization data without sacrificing accuracy, particularly of potential problem locations on the pipeline (e.g. protrusions, dents, twists, movement, etc.). This process is discussed more fully below.

The network 150 is a computer network that interconnects each of the other components of the system 100. The network may be or include the Internet. Devices may connect in different ways to the network, for example, some devices may wirelessly connect via cellular or 802.11x wireless connections while other devices may connect via wired connections such as ethernet, fiber optic cables and the like. The mapping sled 125 is shown as connected to the network 150, but as discussed above, may rely upon local or removable storage (e.g. a hard drive or flash memory card) to store mapping data as it is created. In such a case, the data storage may be physical removed from the mapping sled 125 and inserted into a reader or other device on the data server 120 and may not be connected to the network at all, other than through the data server 120.

Figure 2:
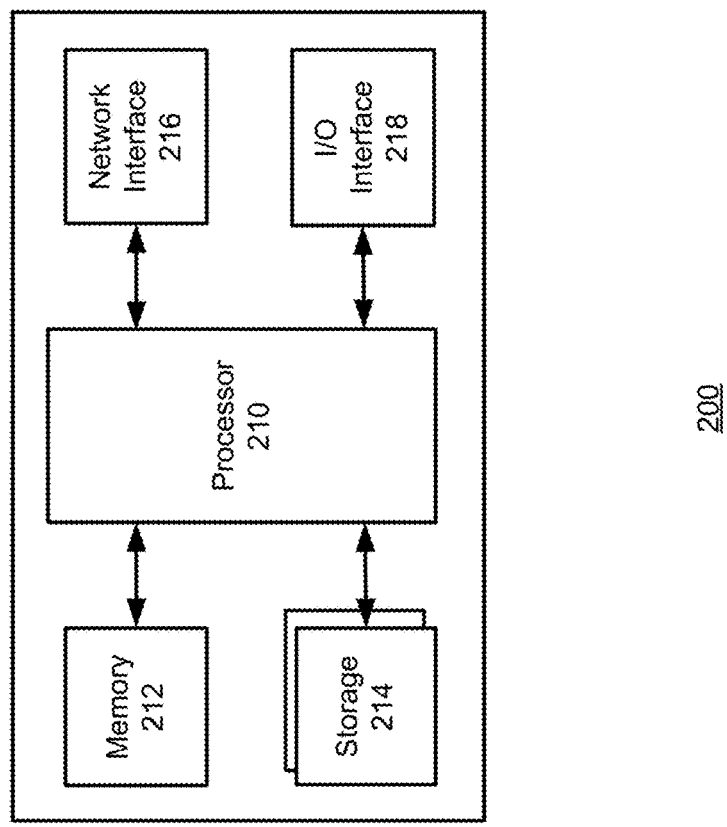
FIG. 2 is a block diagram of a computing device.

Turning now to FIG. 2 there is shown a block diagram of a computing device 200, which is representative of the mobile device 110, the laptop 114, the data server 120, and the visualization server 130 in FIG. 1. The computing device 200 may be, for example, a desktop or laptop computer, a server computer, a tablet, a smartphone or other mobile device. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein. For example, a global positioning system (GPS) receiver or similar hardware may provide location-based services.

The computing device 200 has a processor 210 coupled to a memory 212, storage 214, a network interface 216 and an I/O interface 218. The processor 210 may be or include one or more microprocessors, field programmable gate arrays (FPGAs), application specific integrated circuits (ASICs), programmable logic devices (PLDs) and programmable logic arrays (PLAs).

The memory 212 may be or include RAM, ROM, DRAM, SRAM and MRAM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210. As used herein the term "memory" corresponds to the memory 212 and explicitly excludes transitory media such as signals or waveforms The storage 214 provides non-volatile, bulk or long-term storage of data or instructions in the computing device 200. The storage 214 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the terms "storage" and "storage medium" correspond to the storage 214 and explicitly exclude transitory media such as signals or waveforms. In some cases, such as those involving solid state memory devices, the memory 212 and storage 214 may be a single device.

The network interface 216 includes an interface to a network such as network 150 (FIG. 1). The network interface 216 may be wired or wireless. Examples of network interface 216 may be or include cellular, 802.11x, Bluetooth®, Zigby, infrared, or other wireless network interfaces. Network interface 216 may also be fiber optic cabling, Ethernet, switched telephone network data interfaces, serial bus interfaces, like Universal Serial Bus, and other wired interfaces through which computers may communicate one with another.

The I/O interface 218 interfaces the processor 210 to peripherals (not shown) such as displays, video and still cameras, microphones, keyboards and USB devices such as flash media readers.

Figure 3:
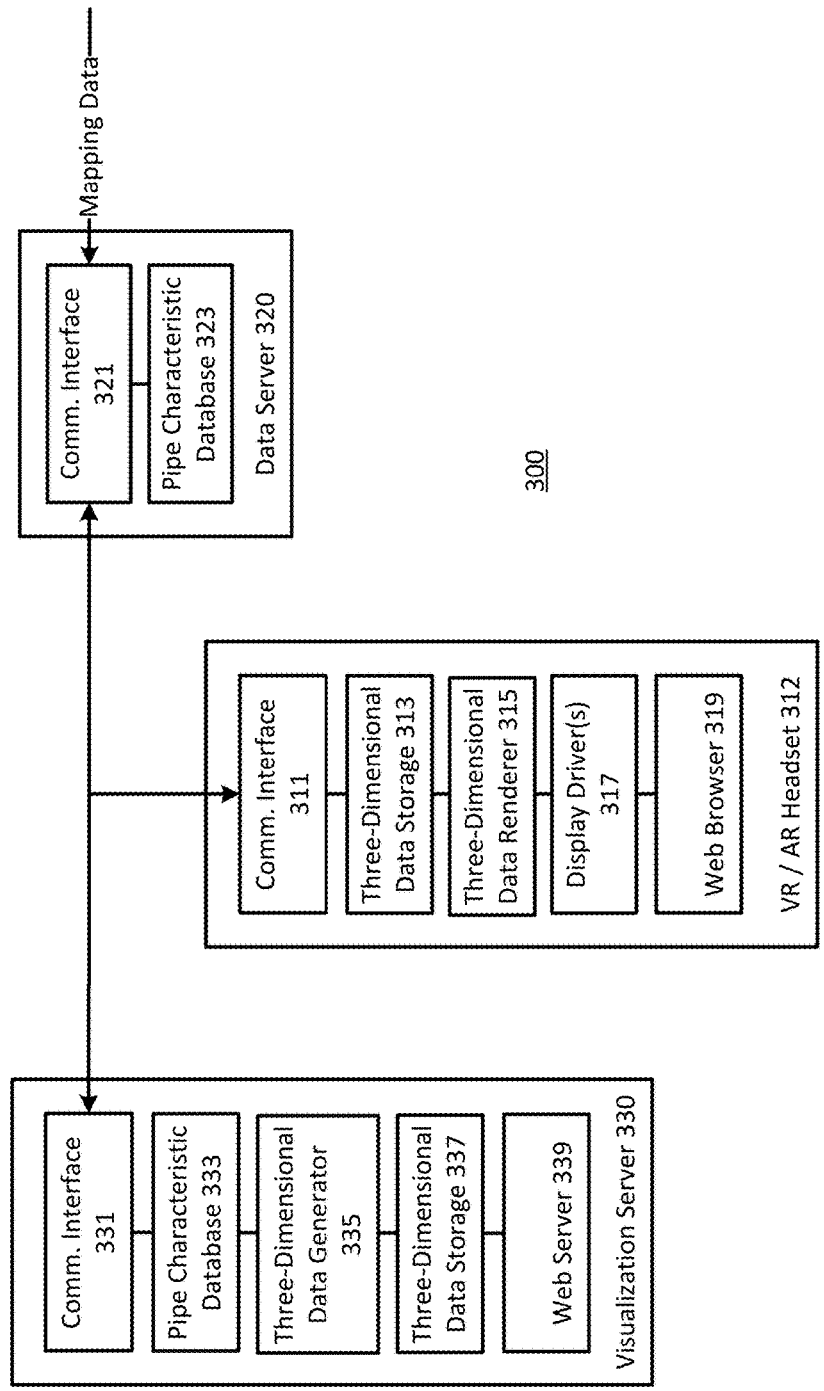
FIG. 3 is a functional diagram of a system for dynamic scaling of visualization data while maintaining desired object characteristics.

Turning to FIG. 3, a functional diagram of a system 300 for dynamic scaling of visualization data while maintaining desired object characteristics is shown. The system 300 includes a VR/AR headset 312, a data server 320, and a visualization server 330. These are the same as the VR/AR headset 112, the data server 120, and the visualization server 130 of FIG. 1. Though shown as distinct, the data server 320 and the visualization server 330 may be the same computing device or group of computing devices (e.g. a server cluster or distributed computing system). In some cases, even a single computing device may perform all of the functions described herein other than viewing the associated data. In other cases, two or more computing devices may perform each function. The breakdown of the associated functions being performed in this and subsequent figures is preferred, but is merely one option among many.

The data server 320 includes a communications interface 321 and a pipe characteristic database 323. The data server 320 receives mapping data at some point prior to the system beginning operations. This mapping data is received via a communications interface 321 that enables communications, for example, using a network (e.g. network 150 in FIG. 1). The mapping data may, alternatively, be physically received by the data server 320 via a physical port on the data server 320 that is managed by the communications interface 321.

The mapping data is stored in the pipe characteristic database 323. This mapping data may be for an entire pipeline or may be for only one, small section of a pipeline. As discussed above, this mapping data may not be in a format suitable for three-dimensional visualization using computer rendering techniques. In a typical case, it is a series of measurements and location data relative to a real location in the world. The pipe characteristic database 323 may store the mapping data in a native format or may format it so as to be more-easily stored (e.g. only showing differences relative to a prior set of data for the same pipe).

The visualization server 330 includes a communications interface 331, a pipe characteristic database 333, a three-dimensional data generator 335, three-dimensional data storage 337 and a web server 339. The visualization server 330 accesses and converts pipe characteristic data from the pipe characteristic database 323 and converts it into three-dimensional data that may be viewed by the VR/AR headset 312.

The communications interface 331 may be used to communicate with the communications interface 321 to transmit a request for the mapping data from the pipe characteristic database 323. The request may be to create a copy of the pipe characteristic database 323 (or the mapping data therein) which may be transmitted via the network 150 to the pipe characteristic database 333. Alternatively, the visualization server 330 may merely access to the pipe characteristic database 323 on the data server 320 without making a complete copy in the pipe characteristic database 333. Selected data or key data may be copied, while leaving the original copy of the mapping data on the data server 320.

The three-dimensional data generator 335 is responsible for translating the mapping data from the pipe characteristic database 323 or 333 into three-dimensional data. As used herein, the phrase "three-dimensional data" means data that is suitable for rendering as a visualization of an associated set of mapping data on a computer display. Three-dimensional data is in a computer graphics format drawn using object modelling techniques that are based upon vertices and triangles as is typical for rendering using three-dimensional video cards typically associated with computer graphics or video gaming. Three-dimensional data is distinct from mapping data in that it is ready for display by a computer video card whereas mapping data is raw data of measurements.

Thus, the three-dimensional data generator 335 uses algorithmic approaches to standardize the relationships of mapping data drawing from the pipe characteristic databases 323 or 333 to create three-dimensional data that may be rendered on a computer display. In addition, and as discussed more fully below, the three-dimensional data generator 335 may create one or more "generalizations" of the three-dimensional data that reduce the overall size of the three-dimensional data for storage or transmission to a viewing device or display without sacrificing desired object characteristics.

Particularly, when performing these types of visualizations of three-dimensional data, changes from prior measurements and any abnormalities in a particular pipe are of the most relevance to an inspector. Therefore, typical algorithms used, for example, in video gaming to reduce the total number of vertices being rendered to enable faster gameplay are not adequate for these purposes. This is because those types of algorithms specifically choose to average or minimize edges in the resulting lower-resolution model so as to make the lower-resolution model look suitably realistic or non-jagged. In contrast, when inspecting pipelines for potential problems, the user is most interested in places in which the pipeline extends furthest out or furthest in from an average diameter, curves unexpectedly, or otherwise exhibits a non-standard shape. Therefore, "smoothing" those issues would serve to hide problems, rather than to highlight them.

Once three-dimensional data, along with any generalizations of that three-dimensional data, is created, it is stored in three-dimensional data storage 337. The data may be stored in connectable "pieces" such that an entire pipeline hundreds of miles long may be broken up into pieces that are only a few meters or few hundred meters long, depending on the scale at which the three-dimensional data is stored. These pieces may or may not correspond to associated pipeline segments.

A web server 339 (which may be or include a streaming server) may optionally be used to provide access to viewing devices. Though shown as a "web" server, virtually any type of data server is envisioned. The primary characteristic of such a web server 339 is that it serves three-dimensional data from the three-dimensional data storage 337 to a requesting, and authorized, device so that the three-dimensional data may be displayed. This may be in the form of or include an actual web server serving HTML or similar web pages, but may also be a stream of video data that shows three-dimensional data served by the visualization server 330, or may be a stream of three-dimensional data itself that is rendered by the VR/AR headset 312 (or other device), or may be requested pieces of three-dimensional data that are transmitted to temporary storage on a viewing device before being displayed.

The VR/AR headset 312 includes a communications interface 311, a three-dimensional data storage 313, a three-dimensional data renderer 315, a display driver 317, and a web browser 319. The VR/AR headset 312 is merely an example of one of the viewing devices from FIG. 1. Any of the other devices such as the mobile device 110 or the laptop 114 may also be used or may be used instead. Likewise, multiple viewing devices may be used simultaneously in the same location or in multiple locations.

The communications interface 311 may be used to request access to the three-dimensional data stored in the three-dimensional data storage 337. The communications interface 311 may operate continuously, continuously requesting access to additional or different or higher-resolution versions of three-dimensional data as a user continues to view a particular pipe visualized by the VR/AR headset 312. Alternatively, the communications interface may operate periodically, only requesting three-dimensional data when needed.

The three-dimensional storage 313 may operate to store three-dimensional data received from the three-dimensional data storage 337. This may be a subset of all available three-dimensional data, only pertaining to a particular pipeline or pipeline section being viewed on the VR/AR headset 312 or may be an entire three-dimensional data set for an entire pipeline or segment, in multiple levels of resolution so that the user may view the pipeline in every available level of granularity while disconnected from a network at a later time.

The three-dimensional data renderer 315 is a three-dimensional "engine" for rendering three-dimensional data. Examples of such engines are so-called "game engines" or computer graphics systems that accept a particular format of three-dimensional data and generate on-screen representations of three-dimensional objects from that three-dimensional data. Video game characters, models, "levels" and virtual worlds are the most well-known type of these three-dimensional data when viewed on a computer display, but virtually any type of data may be rendered using the three-dimensional data renderer, if the data is formatted in such a way as to be interpreted by the three-dimensional data renderer 315.

Though the three-dimensional renderer 315 is shown as a "renderer," it may in fact be a data viewer application that merely presents data (e.g. video data) that is streamed to the VR/AR headset 312 from a renderer at a remote location such as a server or the visualization server 330 itself. In this way, much of the task of rendering, that can be processor intensive may be offloaded to a computing device better-suited to such tasks.

Typically, as discussed above, this type of three-dimensional data is represented as a series of vertices forming a number of triangle "faces" that make up the three-dimensional object. The "faces" are so small that the overall object appears in much the same way that such an object would appear in reality. In the case of a pipeline, the object appears to have a generally round circumference and an elongated tube-like appearance. The presence of "triangles," if visible at all, is virtually non-existent. The overall shape of a pipeline is generated through the use of many thousands or millions of such triangles.

The display driver 317 operates to instruct an associated display to present the visual data presented to it on a physical display (e.g. a display of the VR/AR headset 312).

The web browser 319 is software responsible for accessing the three-dimensional data on the visualization server 330. As discussed above, this data may be streamed as three-dimensional data, as a "video" stream that is already rendered, may be transmitted as a part of a traditional web page, or may take virtually any other form. As such, though described as a "web browser", the web browser 319 may take many forms such as a streaming client, an FTP client, a web browser, or some combination of these or other three-dimensional data receipt systems.

Description of Processes

Figure 4:
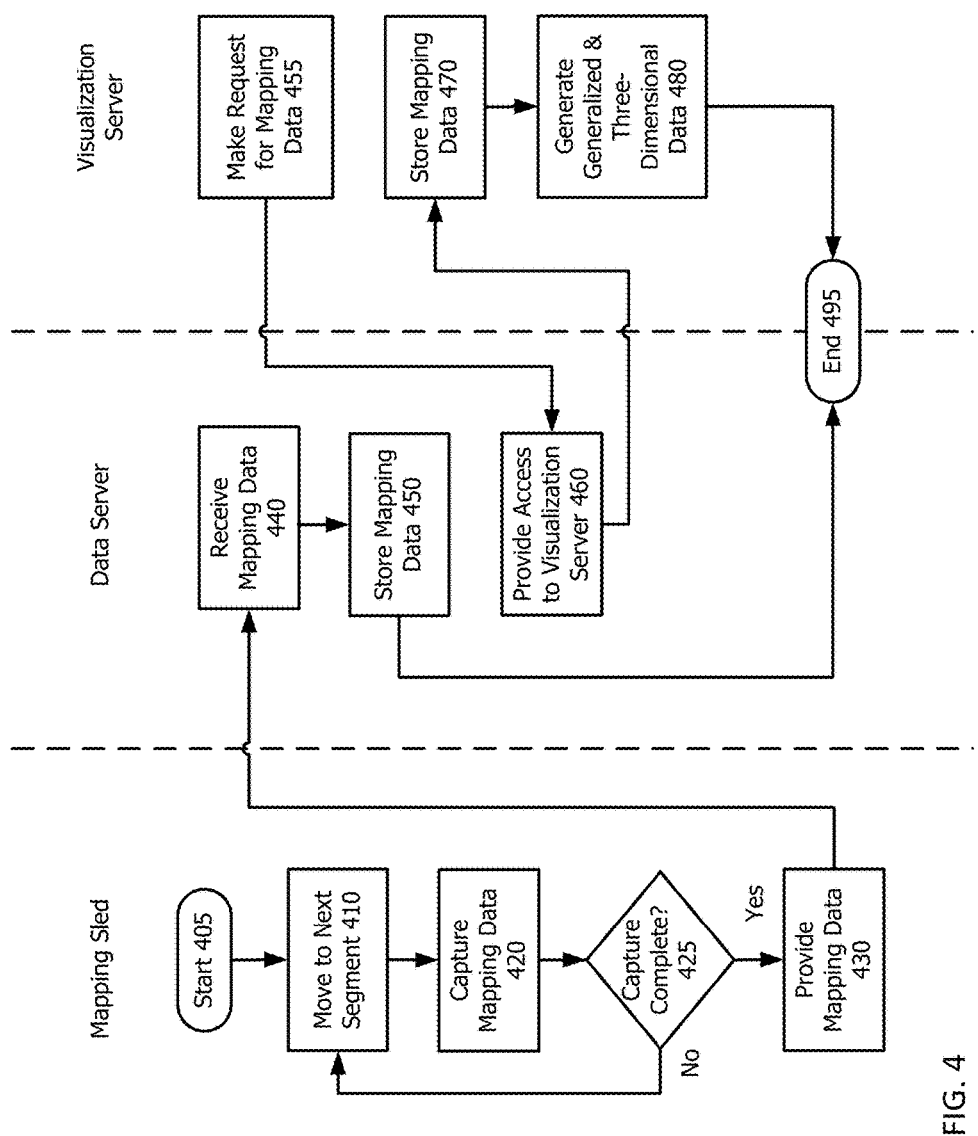
FIG. 4 is a flowchart of a process for generation of dynamic three-dimensional visualization data.

FIG. 4 is a flowchart of a process for generation of dynamic three-dimensional visualization data. The process is shown with a start 405 and an end 495 but may continue for any number of pipelines or pipeline segments. The process is divided into three distinct devices, the mapping sled, the data server, and the visualization server. These may be the mapping sled 125, the data server 120 and the visualization server 130, respectively, of FIG. 1.

Following the start 405, the mapping sled moves to the next segment 410. This "next" segment at the start may in fact be a first segment. A mapping sled has a certain range within which it can capture mapping data. That range may be within a short area around the sensors that capture the mapping data. So, a mapping sled may incrementally move along the interior of a pipe so as to capture each segment within its range. The increments may be very small, on the order of centimeters, or may be larger, on the order of meters. However, the sensors sensitivity may be relatively unrelated to the increments. For example, the sensors may capture a full meter of data per increment the mapping sled moves, but the granularity of that data may be such that it is accurate down to a millimeter or centimeter square, no matter the movement increments of the mapping sled.

After the mapping sled has moved to the next segment (or first segment) at 410, the mapping data is captured at 420. As indicated above, the mapping data may have a high degree of granularity, such that it includes extremely accurate measurements for depth from a centerline of a pipe and pipe position (relative to an exterior point or points, such as GPS). The measurements may be a predetermined number of radial measurements about that centerline. The pipe position measurements may utilize GPS to derive a detailed map of the location of the pipe within the physical world. In this way, movement of the pipe over time can be detected when recent measurements are compared with historical measurements.

Once data is captured for the particular segment at 420, a determination whether the capture process is complete for the pipe is made at 425. This may be a determination made by the mapping sled itself or may be influenced by external factors, such as control by a mapping sled operator. If the capture is not complete ("no" at 425), meaning that there remains more pipeline to capture, the mapping sled is moved to the next pipeline segment at 410 and the process continues from there.

If the capture is complete ("yes" at 425), then the entire pipeline or subset thereof that is desired has been captured and the mapping data is provided to the data server at 430. This providing may be transmission over a wired or wireless network, as discussed above, or may utilize removable or transferrable storage that is moved or copied to the data server once a mapping operation is complete for a pipeline.

At 440, the mapping data is received by the data server. This data may be received, as indicated above, via a network connection or through a physical connection to a storage device.

Once received, the mapping data is stored at 450. The data is, preferably, stored in the pipe characteristic database 323 (FIG. 3). The data may be stored alongside historical data corresponding to the same pipe or portion thereof and may be stored with numerous other mapping data from many other pipes that are stored together for ease of access. The process, for the data server, then ends at 495 until a request is received.

Later, the visualization server may request mapping data at 455. That request may be a network-base request seeking to directly access the mapping data stored on the data server without copying it, but merely relying upon it or accessing it remotely. Alternatively, that request may be a request to make a copy of the mapping data. The request may pertain to all mapping data stored on the data server or only to a subset associated with a particular pipe or pipes.

Once the request is received, and assuming that the visualization server is properly authorized to receive the mapping data, access to the mapping data is provided for the visualization server at 460. If that data is transmitted, rather than merely made accessible to the visualization server, then that mapping data is stored at 470. This may be stored in the pipe characteristic database 333 (from the pipe characteristic database 323) in FIG. 3.

Finally, the visualization server may use that mapping data to generate three-dimensional data and generalize that three-dimensional data at 480. At this stage, the mapping data is converted into data that may be displayed by a three-dimensional imaging software or modelling software on a computer display.

Thereafter, the process ends at 495. One or more users may request access to the three-dimensional data or to generalized three-dimensional data for purposes of displaying that data on a display. That process is discussed with reference to FIG. 6 below.

Figure 5:
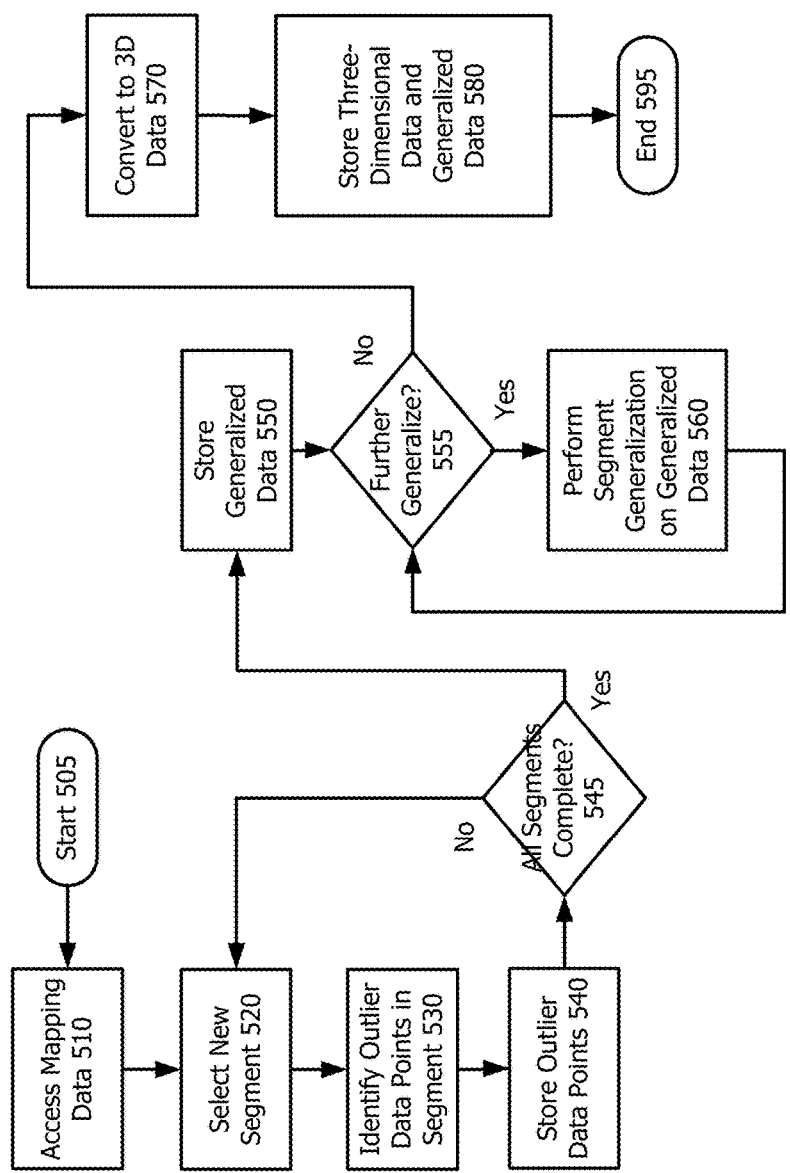
FIG. 5 is a flowchart of a process for generalizing three-dimensional visualization data.

FIG. 5 is a flowchart of a process for generalizing three-dimensional visualization data. The process has a start 505 and an end 595, but can operate simultaneously for multiple sets of mapping data and three-dimensional data. Accordingly, multiple instances of the process may operate simultaneously.

Once the process has begun at start 505, the mapping data is accessed by a visualization server at 510. As discussed with reference to FIG. 4, this access may be by transmission and storage of the mapping data on the visualization server. Alternatively, this may be mere access to the mapping data remotely from the data server. The mapping data is descriptive of the associated pipeline, but may not be in a form suitable for review by visual three-dimensional modelling software.

After the mapping data is accessed, it is converted to three-dimensional data at 520, then stored. As discussed above, this conversion results in the translation of the mapping data describing characteristics of a particular pipe into three-dimensional data that may be rendered by appropriate three-dimensional data viewing software. The three-dimensional data is, typically, a series of vertices interlaced so as to create a web of triangles with colors, skins, or textures applied to their exterior faces to mimic the appearance of real-world objects. The resulting three-dimensional data may be stored locally on the visualization server.

After the data has been converted into three-dimensional data suitable for display, the process of "generalizing" the data may begin. As used herein, the word "generalize" or "generalization" means reducing the total number of data points relevant to the three-dimensional data to, thereby, reduce the resolution of the three-dimensional data. However, when "generalization" takes place, as that word is used herein, the reduction in resolution is expressly designed to avoid removal of any points of interest in the three-dimensional data that would be relevant to a pipeline inspector or for any pipeline analysis. Accordingly, rather than "smoothing" over points that stand out in the three-dimensional data, the process described as "generalization" herein retains the most-outlying points so that they may be seen when reviewed by an analyst.

Once the three-dimensional data is stored, a segment of that data is selected at 530. The segment may be a few meters in length or several kilometers in length, but the process envisioned operates upon segments of approximately one centimeter at a time, before moving on to the next segment, until all desired segments have been generalized.

Next, the process identifies the outlier data points in the selected segment at 540. At this step, the most out-of-the-norm points in the three-dimensional data for that segment are identified. Preferably, a segment one centimeter in length includes a predetermined number of radial measurements from a detected centerpoint or centerline for the pipe. For example, each segment may be represented by 80 radial measurements that appear to slice up a one centimeter thick "pie" into 80 pieces. Simultaneously, the three-dimensional data includes a measurement of the location of the pipe relative to external markers, such as GPS, which may be correlated to external geography and topology.

While identifying the outlier radial measurements, from among the 80 radial measurements, those that are least like the others are identified. This may be done, for example, by taking an average length of those radius measurements, then comparing that average to each of the 80 radial measurements. Those with the greatest absolute value difference of the 80 are those that are the outliers. The most non-average 16 (or other quantity less than the predetermined number of radial measurements) may be selected to be representative of the original 80 measurements. In order to maintain uniformity, the outlier data points are further restricted not to include too many immediately adjacent data points. This could occur where there is one prominent "dent" or protrusion in the pipe at a particular point. Accordingly, the number of adjacent points may be limited to 2 or there may be a restriction that only so many points may be within a particular ¹⁄₁₆ or ¼ of the overall "pie." This ensures that the overall shape of the pipe cross-section will continue to be represented by the associated data while simultaneously emphasizing the outlier data points rather than those most average.

Alternatively, or in addition, the outlier points may be outliers with reference to historical three-dimensional data for the same point within the pipe. So, for example, the software may detect that this particular radial measurement is not that dissimilar than other nearby radial measurements, but that it is a significantly large radial measurement than was found in the same location a mere 3 months ago or 6 months ago. In such a case, the "change" in the radial measurement over time may be highlighted as an outlier, even though the actual measurement is relatively normal under ordinary circumstances. Any significant changes, even returning to uniformity, may represent potential problems for a pipeline.

These outlier data points are stored at 550 as a part of a generalized data set for a particular pipe (or portion thereof).

Next, a determination is made whether all segments for a particular pipe have been generalized at 555. If not ("no" at 555), then the process returns to selection of a new segment of the pipeline at 530, thereby moving down the pipe one portion. Thereafter, the same process continues for that pipe segment at 540-555.

If all segments are complete ("yes" at 555), then the process continues to storage of that generalized data at 560. Here, the outlier data points are stored as a subset of the full-resolution three-dimensional data for a particular pipe. If the first tier of three-dimensional data is 80 radial measurements per 1 centimeter of pipe traversed, along with a centerline relative to external reference points (e.g. GPS), then the generalized data may be 16 radial measurements per 1 centimeter of pipe traversed, along with a centerline relative to external reference points.

In much the same way, segments may also be generalized. For example, if there are measurements for each 1 centimeter of pipe traversed, that may be generalized, by selecting the outliers in a full meter (100 centimeters) of pipe for each of the 80 or 16 measurements. In such a way, the overall number of measurements stored (and that must be transmitted for viewing by a viewing device) may be dramatically reduced. This scaling may also be further scaled to 1 set of 80 or 16 radial measurements per kilometer or per portion of a kilometer, depending on the desired granularity. Multiple levels of granularity may be desirable for different purposes and different viewing scales.

Once the generalized data is stored at 560, a determination whether to further generalize may be made at 565. If not ("no" at 565), then the three-dimensional data (the original data at full resolution) and the generalized data are stored at 580.

If further generalization is desired ("yes" at 565), then further segment generalization may be performed on the associated generalized data for one or more segments at 570. Though 80 radial measurements down to 16 and 1 centimeter granularity up to 1 meter or 1 kilometer are discussed above, still further generalization may be performed here. There may be multiple levels of any number of scaling. But, for example, the 16 radial measurements here may be further reduced to only 4 radial measurements at a 10 meter segment. While viewing this type of data close up would be relatively non-helpful to an analyst, viewing this data at a scale on the order of kilometers at a time would still highlight the most "outlier" portions of the associated pipeline while at such a macro scale. As a result, the visualization of such data, even when generalized to this extent, still serves the purpose of enabling an individual to see outlier or potential problem areas for a particular pipeline.

The size of the associated data varies dramatically when scaled in this way. For example, a full resolution data set of 80 radial measurements per 1 centimeter may be 8 megabytes. A 16 radial measurements per 2 meter resolution may reduce the data storage requirement to 1.6 megabytes per that 2 meter distance. A 4 radial measurements per 10 meter resolution may lower the data requirements to 800 kilobytes per 10 meter distance. As can be imagined, for pipelines that stretch potentially hundreds of miles, the storage and data transmission bandwidth savings can be dramatic. Even if the visualization server retains each resolution, viewing devices, which may in some cases be tablets or mobile phones, may only request lower resolutions or high resolutions for limited segments, thereby avoiding large amounts of data storage and bandwidth usage.

Once no further generalization is required or desired ("no" at 565), all of the three-dimensional data (original data) and each generalization is stored at 580. This data may be stored, for example, in the three-dimensional data storage 337 of FIG. 3.

Then, the process may end at 595.

Figure 6:
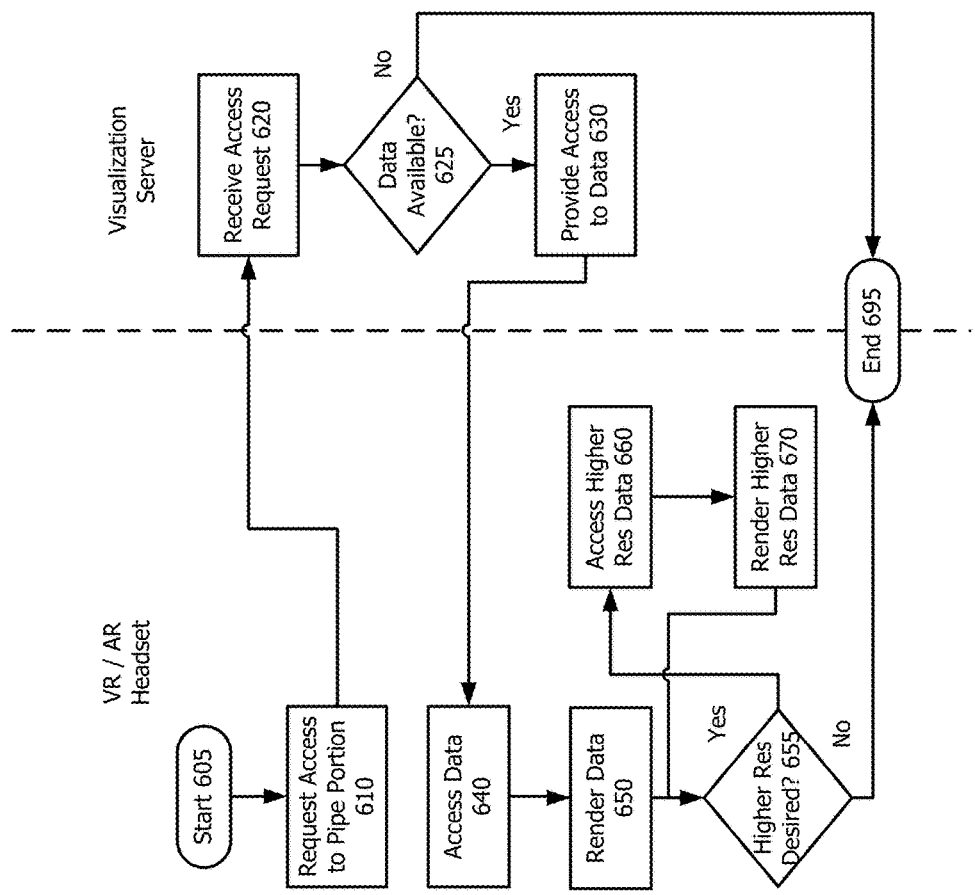
FIG. 6 is a flowchart of a process for accessing generalized three-dimensional visualization data.

FIG. 6 is a flowchart of a process for accessing generalized three-dimensional visualization data. The process has a start at 605 and an end at 695, but may take place simultaneously for multiple viewing devices.

Once the process starts at 605, a VR/AR headset may request access to a pipe portion at 610. Though shown as the VR/AR headset, any of the viewing devices described with reference to FIG. 1 may make such a request. The VR/AR headset was selected as only an example.

The access request may include an authentication protocol, a login process, a username, password, unique key, two-factor authentication, or other process to ensure that detailed access to pipeline data is not available to anyone who desires such data, but only to those authorized to view it. The request may include identification of a particular pipeline (e.g. Pipeline 1, section 287) or to a particular location (e.g. a latitude and longitude or physical address) that includes a pipeline. Alternatively, this request may be clicking or scrolling on a visible map of a location.

The visualization server receives such an access request at 620. It may be authenticated, as is known in the art, then a determination is made at 625 whether three-dimensional data is available. If not ("no" at 625), then the process ends at 695. A notification may be provided to the requesting device.

If three-dimensional data is available ("yes" at 625), then access to that data may be provided. Access may mean that the three-dimensional data is streamed in real-time as requested, or it may mean that download of an entire data set pertaining to a particular pipeline or segment of a pipeline is made available.

The VR/AR headset accesses the data 640 either as a stream, a download, or a dynamic download (requesting only low resolution versions until more granularity is requested or user interactions suggest it is needed).

The three-dimensional data, at whatever level of generalization, is then rendered at 650. This means that the three-dimensional data is displayed on the display of the VR/AR headset (or other viewing device). If the data is low-resolution or if a viewer is particularly "zoomed out" from the pipeline, the data may appear to be quite generalized. However, as a user "zooms in" the software may automatically, or upon request, indicate that it is interested in obtaining higher resolution at 655.

This may automatically occur as the user "zooms in" or may happen in the background to account for user interaction indicating that a particular portion of the pipe is of particular interest to a viewer. Or, a user may merely request that it begin downloading a higher resolution version of the three-dimensional data.

If not ("no" at 655), then the process ends with the viewer viewing the current resolution of data.

If so ("yes" at 655), then a higher resolution version of the three-dimensional data may be accessed at 660. This data may be on the visualization server or may already be in the process of being downloaded (or streamed) to the VR/AR headset, or may already have been downloaded, but not rendered, by the VR/AR headset.

Once the higher resolution version of the three-dimensional data is accessed, it is rendered at 670. This process of accessing higher resolution three-dimensional data may take place so long as higher resolution data is available.

Then, the process may end at 695.

Figure 7:
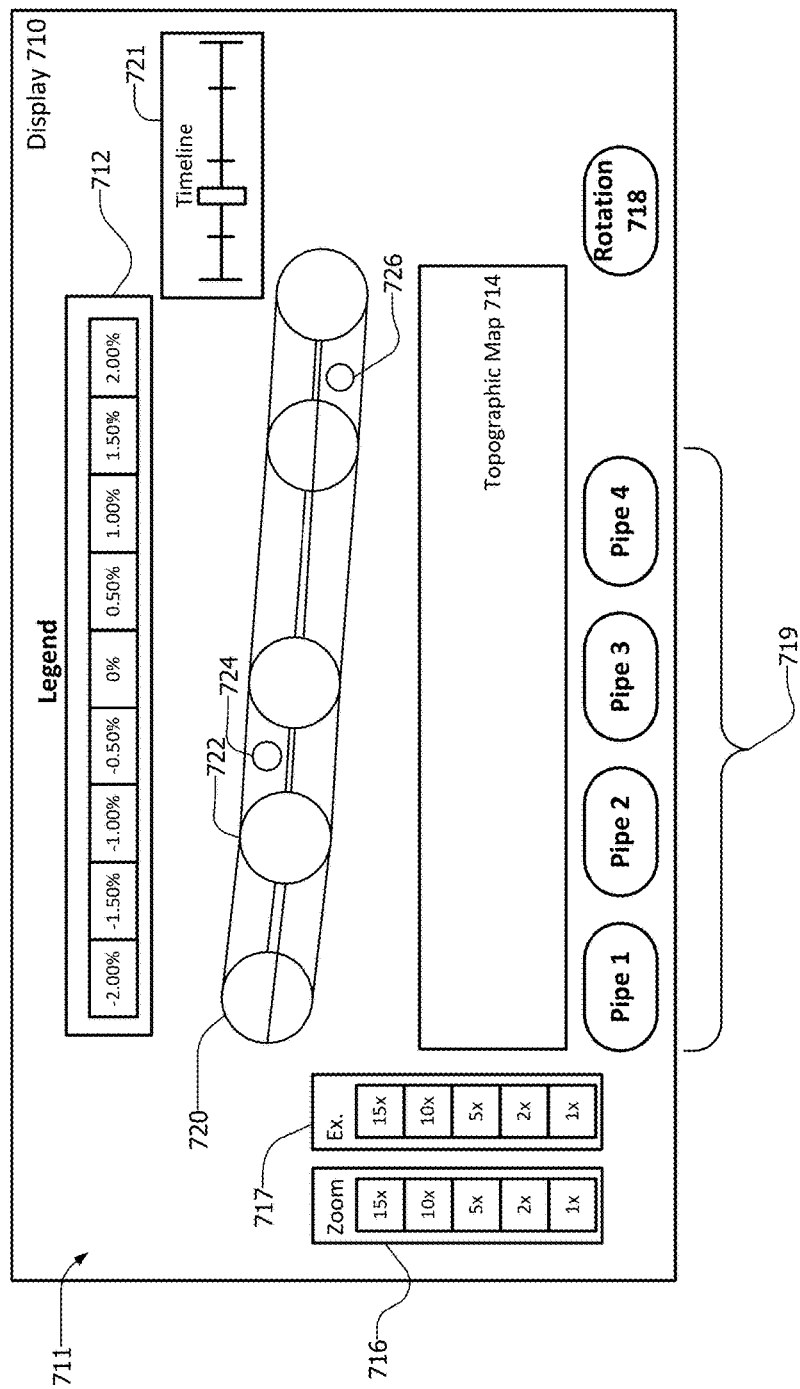
FIG. 7 is an example user interface for a system for dynamic scaling of visualization data while maintaining desired object characteristics.

FIG. 7 is an example user interface 711 for a system for dynamic scaling of visualization data while maintaining desired object characteristics. This user interface 711 is shown on a display 710 and is merely an example of a potential user interface 711 for purposes of illustration.

The user interface includes a legend 712 with varying levels of color-coded transformation of the associated pipe indicated. For example, a −2.00% change may mean that, at a particular location on the pipeline, it is "dented inward" at least 2% in a particular location and may be color-coded in a bright red. A 0% change may mean that the pipeline area of the associated color (e.g. white), may have no change relative to an expected location and radial measurement. A 2.00% change may mean that a particular location on the pipeline is "dented outward" by at least 2% and may be color-coded in purple. As a result, the overall effect appears as a heat map indicating those areas with inward and outward dents (or unexpected bends in positioning of the pipe relative to external locations) visually for a particular pipe section. Those areas may further be highlighted in some cases. This color coding may be applied to one or more "faces" of the three-dimensional representation of the pipe in the three-dimensional modeling software.

A topographic map 714 may also be shown to show the pipeline relative to the surrounding topography. This image may highlight the pipeline itself, but also include a three-dimensional image of the ground, the pipeline's depth beneath the ground, relevant geological markers or other data (e.g. water, mountains, large stones, etc.), and may act as a "scroll" area where a user can move or select a pipeline portion for analysis. In this way, the topographical map may be at a much larger scale than the actual pipeline section shown to enable rapid movement by a user along an entire section of pipeline that may be many kilometers long.

A level of zoom 716 for the pipeline view may be selected as a series of buttons. Alternatively, this may be a scrollbar or other, similar user interface mechanism. Similarly, a rotation button 718 may enable a user to rotate the pipe 720 that is displayed. Alternatively, a user may merely click and drag (or shift+click and drag) on the pipe 720 itself to alter the rotation.

A pipe selection area 719 may also be provided with buttons for available pipes or potentially a text-entry box to input a particular pipe identifier.

The display of the pipe 720 may incorporate highlighted areas (based upon the legend 712) such as an unusual bend 722, or areas of dents in at 724 or outward dents at 726. Those areas may appear appropriate color-coded and may be highlighted automatically by the computer using other methods (e.g. circles or arrows).

The display 710 shown appears as a single image suitable for a mobile device, table, computer or similar device, but two images may be generated for VR/AR viewing.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus, including processor and memory, the processor executing instructions that cause the processor to:
   receive and store three-dimensional data pertaining to a tubular physical object, the tubular physical object represented by a series of segments along a longitudinal axis of the tubular physical object, the three-dimensional data including a predetermined number of measurements of the series of segments;
   generate an average measurement value for each of the series of segments comprising an average radius of the tubular physical object for each of the series of segments;
   generate a first generalization of the three-dimensional data by selecting, for each of the series of segments, a desired number of measurements selected before receipt of the three-dimensional data and fewer than the predetermined number of measurements, that represent the largest deviations from the respective average measurement;
   store the first generalization of the three-dimensional data in a data storage; and
   generate a three-dimensional model of the first generalization of the three-dimensional data.

2. The apparatus of claim 1 wherein the instructions further cause the processor to:
   generate a second generalization of the three-dimensional data by selecting, for each of the series of segments, a second desired number of measurements, fewer than the desired number of measurements, that represent the largest deviations from the respective average measurement within each segment of the series of segments;
store the second selected measurements as the second generalization of the three-dimensional data; and
generate a second three-dimensional model of the second generalization of the three-dimensional data.

3. The apparatus of claim 2 wherein the instructions further cause the processor to:
transmit the second three-dimensional model of the second generalization to be rendered on a computing device distinct from the apparatus; and
upon request, transmit the three-dimensional model of the three-dimensional data to be rendered on the computing device distinct from the apparatus in response to user input.

4. The apparatus of claim 1 wherein the instructions further cause the processor to render the three-dimensional model of the first generalization of the three-dimensional data.

5. The apparatus of claim 1 wherein the instructions further cause the processor to transmit the three-dimensional model of the first generalization to be rendered on a visualization device distinct from the apparatus.

6. The apparatus of claim 5 wherein the visualization device, including a second processor and a second memory, executes instructions that cause the second processor to:
receive the three-dimensional model; and
generate a visual representation of the three-dimensional model on a display.

7. The apparatus of claim 1 wherein at least one characteristic of the first generalization is selected based upon characteristics of a device upon which the three-dimensional model is to be rendered.

8. The apparatus of claim 1 wherein the instructions further cause the processor to:
determine a location of a center transverse for each of the series of segments; and
calculate a change of the location relative to a prior location of the center transverse.

9. The apparatus of claim 8 wherein the instruction further cause the processor to:
generate a center transverse average;
select, from among the center transverse for each of the series of segments, a second predetermined number of the center transverse that represent the largest deviation from the center transverse average; and
store the selected center transverse as a center transverse generalization.

10. A method of providing visualization data comprising:
receiving and storing three-dimensional data pertaining to a tubular physical object, the tubular physical object represented by a series of segments along a longitudinal axis of the tubular physical object, the three-dimensional data including a predetermined number of measurements of the series of segments;
generating, by a processor, an average measurement value for each of the series of segments comprising an average radius of the tubular physical object for each of the series of segments;
generating, by the processor, a first generalization of the three-dimensional data by selecting, for each of the series of segments, a desired number of measurements, selected before receipt of the three-dimensional data and fewer than the predetermined number of measurements, that represent the largest deviations from the respective average measurement;
storing, in a data storage, the first generalization of the three-dimensional data; and
generating a three-dimensional model of the first generalization of the three-dimensional data.

11. The method of claim 10 further comprising:
generating a second generalization of the three-dimensional data by selecting, for each of the series of segments, a second desired number of measurements, fewer than the desired number of measurements, that represent the largest deviations from the respective average measurement within each segment of the series of segments;
storing the second selected measurements as the second generalization of the three-dimensional data; and
generating a second three-dimensional model of the second generalization of the three-dimensional data.

12. The method of claim 11 further comprising:
transmitting the second three-dimensional model of the second generalization to be rendered on a remote computing device; and
upon request, transmitting the three-dimensional model of the three-dimensional data to be rendered on the remote computing device in response to user input.

13. The method of claim 10 further comprising rendering the three-dimensional model of the first generalization of the three-dimensional data.

14. The method of claim 10 further comprising transmitting the three-dimensional model of the first generalization to be rendered on a visualization device.

15. The method of claim 14 further comprising:
receiving the three-dimensional model; and
generating a visual representation of the three-dimensional model on a display.

16. The method of claim 10 wherein at least one characteristic of the first generalization is selected based upon characteristics of a device upon which the three-dimensional model is to be rendered.

17. An apparatus comprising a computing device, including processor and memory, the apparatus executing instructions that cause the processor to:
receive and store three-dimensional data pertaining to a tubular section of a pipe, the pipe represented by a series of segments along a longitudinal axis of the pipe, the three-dimensional data including a predetermined number of radial measurements from a center transverse of the series of segments;
generate an average radial measurement value for each of the series of segments comprising an average radius of the pipe for each of the series of segments;
generate a first generalization of the three-dimensional data by selecting, for each of the series of segments, a desired number of measurements selected before receipt of the three-dimensional data and fewer than the predetermined number of measurements, that represent the largest deviations from the respective average radial measurement;
store the first generalization of the three-dimensional data in a data storage; and
generate a three-dimensional model of the first generalization of the three-dimensional data.

18. The apparatus of claim 17 wherein the instructions further cause the processor to render the three-dimensional model of the first generalization of the three-dimensional data.

19. The apparatus of claim 17 wherein the instructions further cause the processor to transmit the three-dimensional model of the first generalization to be rendered on a visualization device distinct from the apparatus.

20. The apparatus of claim 17 wherein at least one characteristic of the first generalization is selected based upon characteristics of a device upon which the three-dimensional model is to be rendered.

* * * * *